US007726932B2

(12) United States Patent  
Leblanc et al.

(10) Patent No.: US 7,726,932 B2
(45) Date of Patent: Jun. 1, 2010

(54) METHOD AND TOOL FOR THE SEPARATION OF A PILE OF RECIPIENTS

(75) Inventors: Paul Leblanc, Laval (CA); Robert Battaglia, St-Leonard (CA); Dominic Prevost, Rive-Nord (CA); Philippe Hakier, Laval (CA)

(73) Assignee: Axium, Inc., Montreal (CA)

( * ) Notice: Subject to any disclaimer, the term of this patent is extended or adjusted under 35 U.S.C. 154(b) by 740 days.

(21) Appl. No.: 10/856,121

(22) Filed: May 28, 2004

(65) Prior Publication Data

US 2006/0051195 A1 Mar. 9, 2006

(51) Int. Cl.
*B65G 59/00* (2006.01)

(52) U.S. Cl. .................. 414/796; 414/798.2; 414/798.9

(58) Field of Classification Search .............. 414/789.5, 414/791.8, 791.9, 799.3, 797.2, 797.6, 797.7, 414/797.8, 798.97, 796, 798.2; 198/419.3, 198/419.1, 419.2; 422/107
See application file for complete search history.

(56) References Cited

U.S. PATENT DOCUMENTS

| 3,124,260 | A | * | 3/1964 | Tidball | 294/65.5 |
| 3,127,029 | A | * | 3/1964 | Luginbuhl | 414/798.9 |
| 4,038,909 | A | * | 8/1977 | Preisig | 198/418.8 |
| 4,098,392 | A | * | 7/1978 | Greene | 198/419.3 |
| 4,537,550 | A | * | 8/1985 | Mojden et al. | 414/790.3 |
| 4,869,359 | A | * | 9/1989 | Muller et al. | 198/419.2 |
| 5,016,420 | A | * | 5/1991 | Chiappe et al. | 53/138.1 |
| 5,017,085 | A | * | 5/1991 | Ishikawa | 414/796 |
| 5,095,684 | A | * | 3/1992 | Walker et al. | 53/443 |
| 6,443,689 | B1 | * | 9/2002 | Reggiani | 414/795.6 |
| 2002/0154986 | A1 | * | 10/2002 | Leblanc et al. | 414/795 |

* cited by examiner

*Primary Examiner*—Gregory W Adams
(74) *Attorney, Agent, or Firm*—K&L Gates LLP

(57) ABSTRACT

The separation tool allows separation of a horizontal pile of recipients into sub-piles of recipients, the first or last recipient of each sub-pile have been previously marked with ultraviolet detectable ink. The tool comprises a frame; a sensor mounted to the frame for detecting the last recipient of a current sub-pile or the first recipient of the next sub-pile upstream therefrom, which ever has been previously marked, and a manipulator arm provided with a fixed finger assembly for holding the recipients upstream from the last recipient of the current sub-pile and a separation finger for creating a gap between the held recipients and those from the current sub-pile.

16 Claims, 14 Drawing Sheets

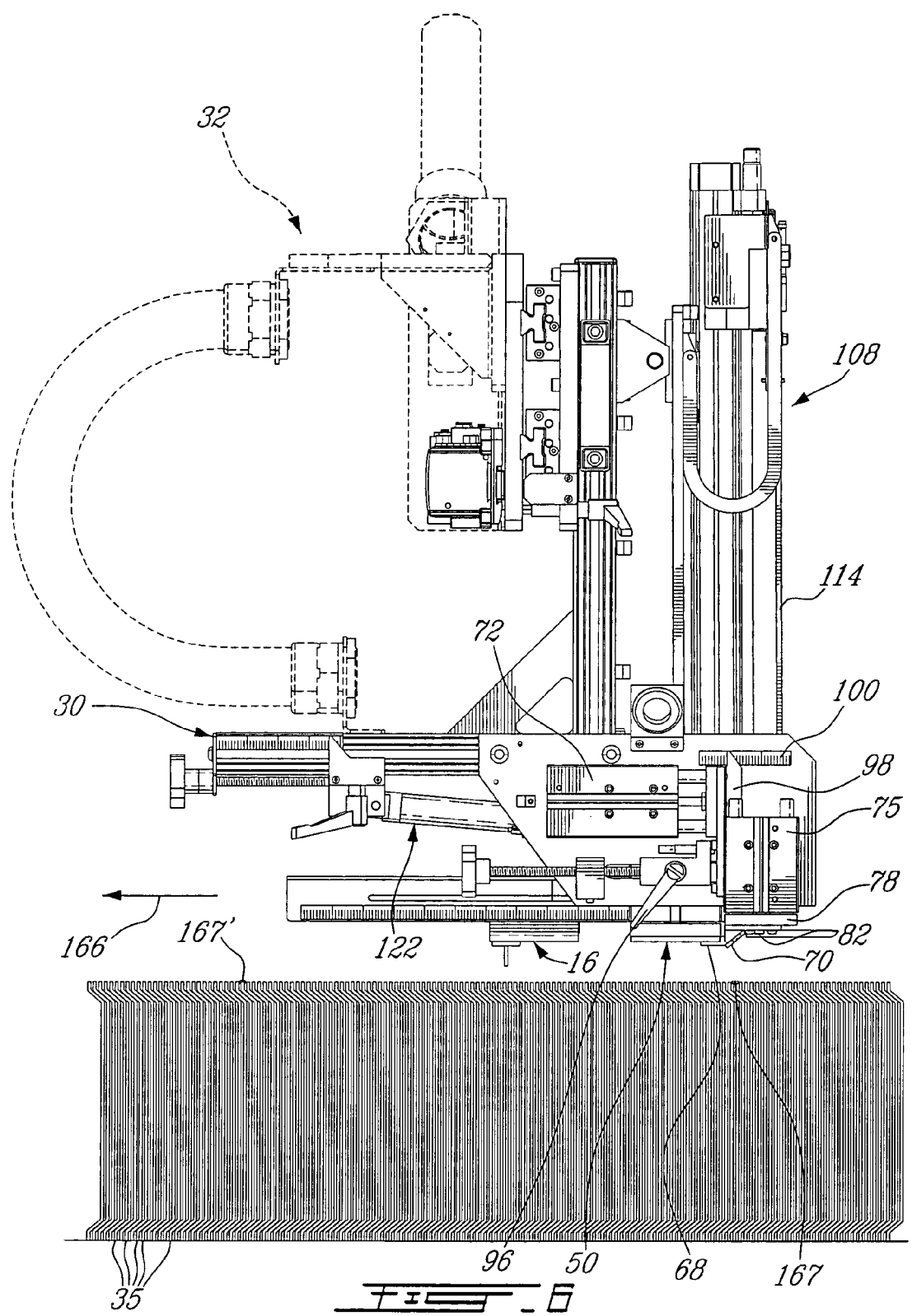

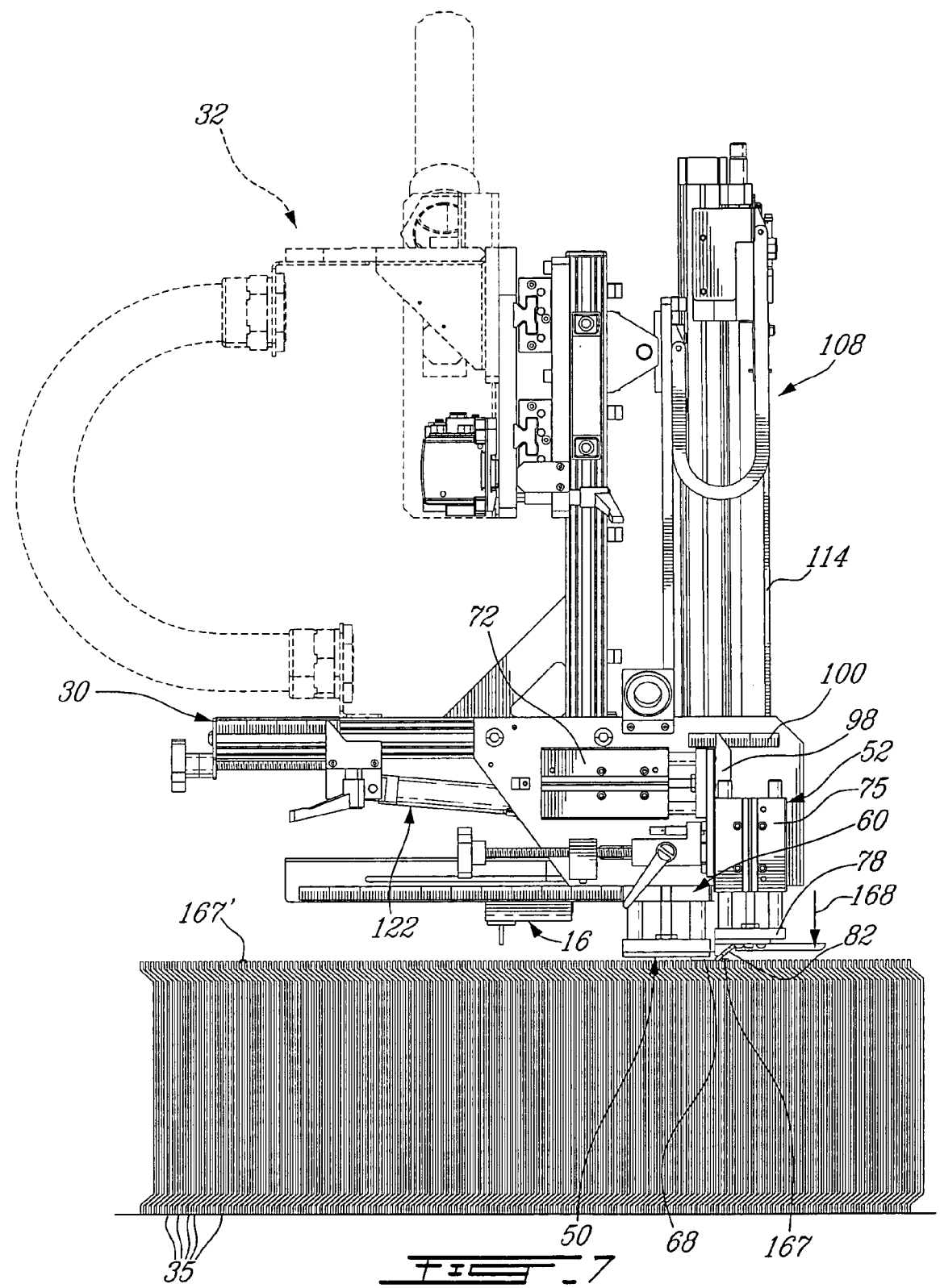

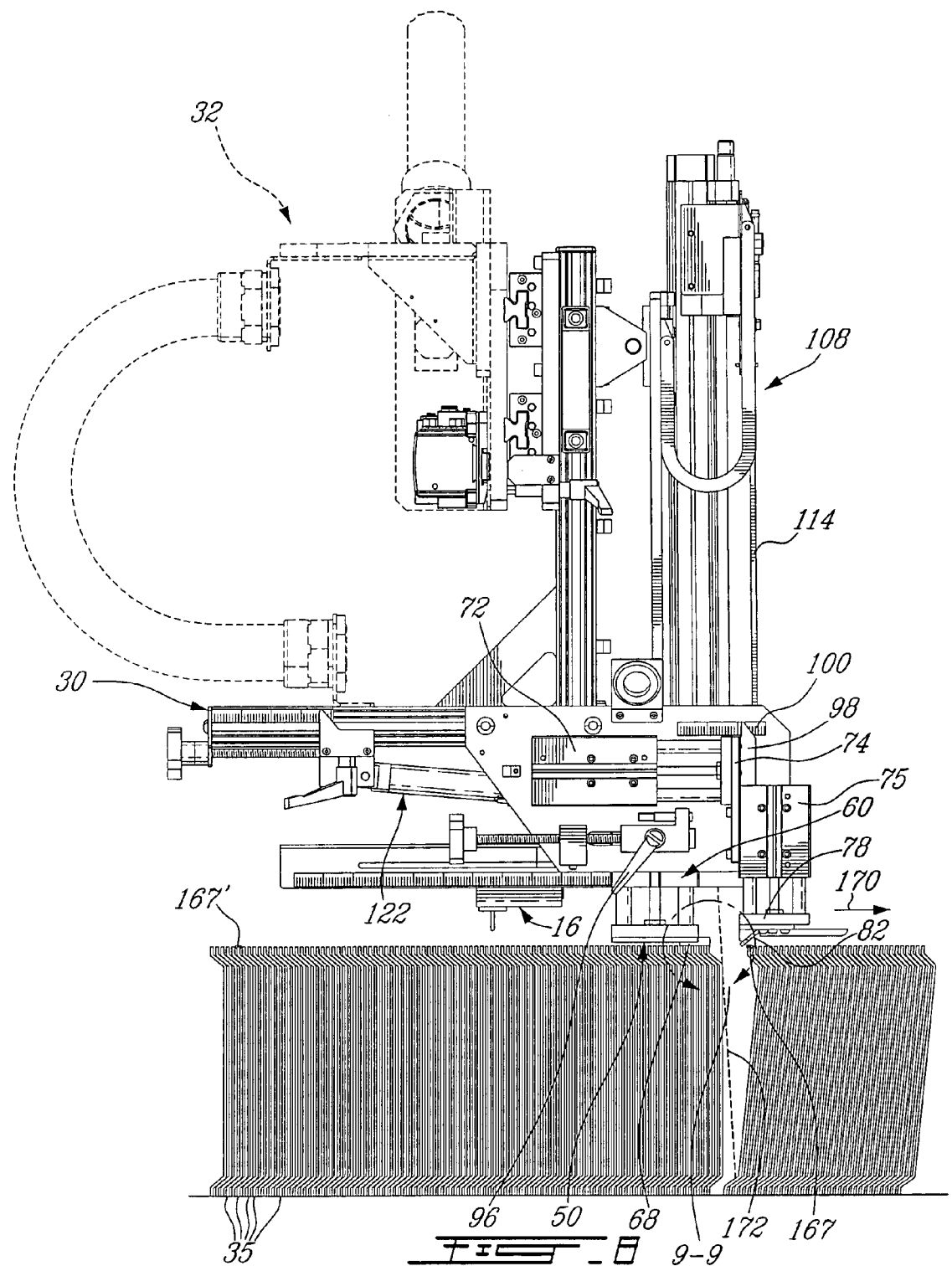

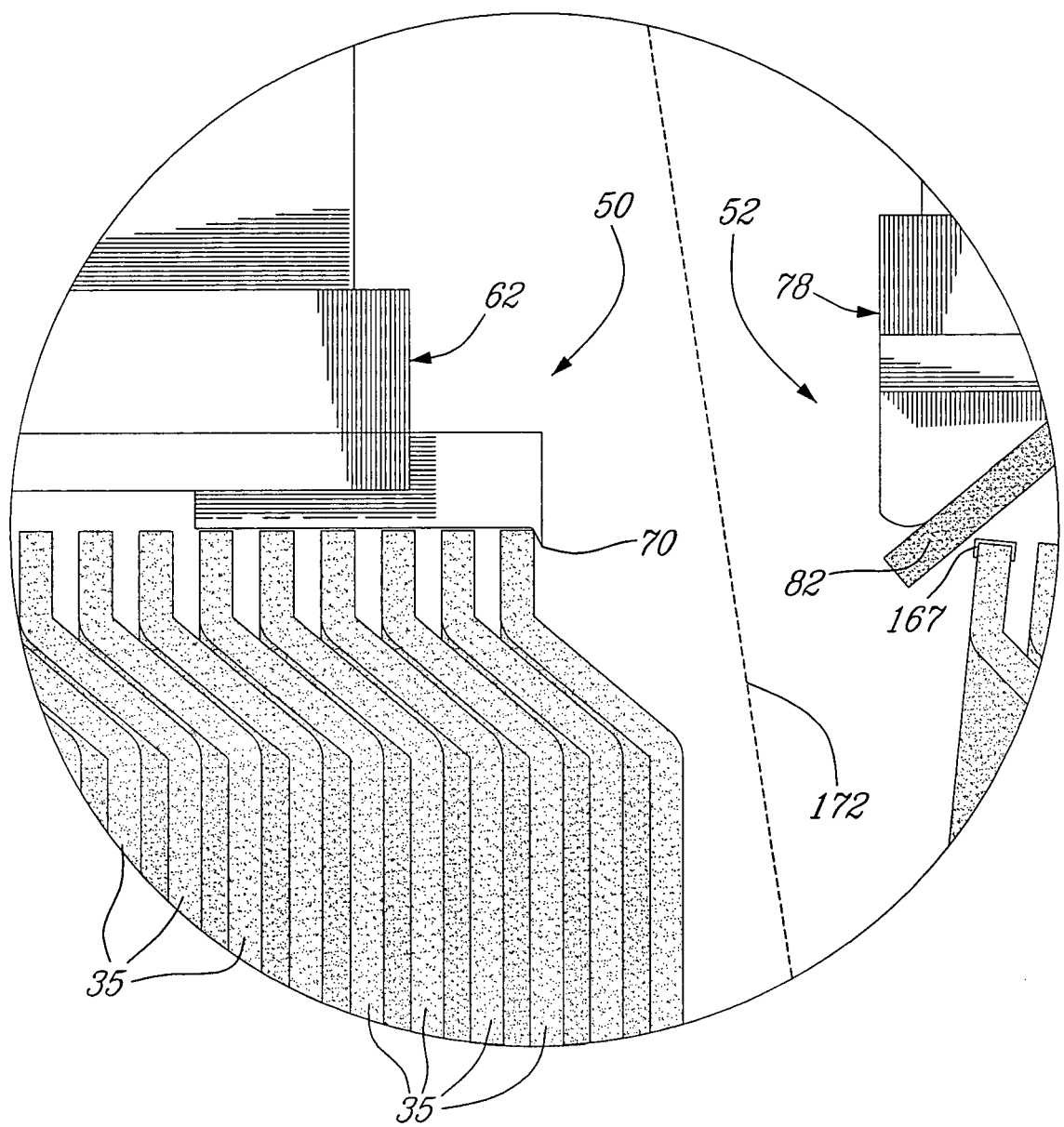

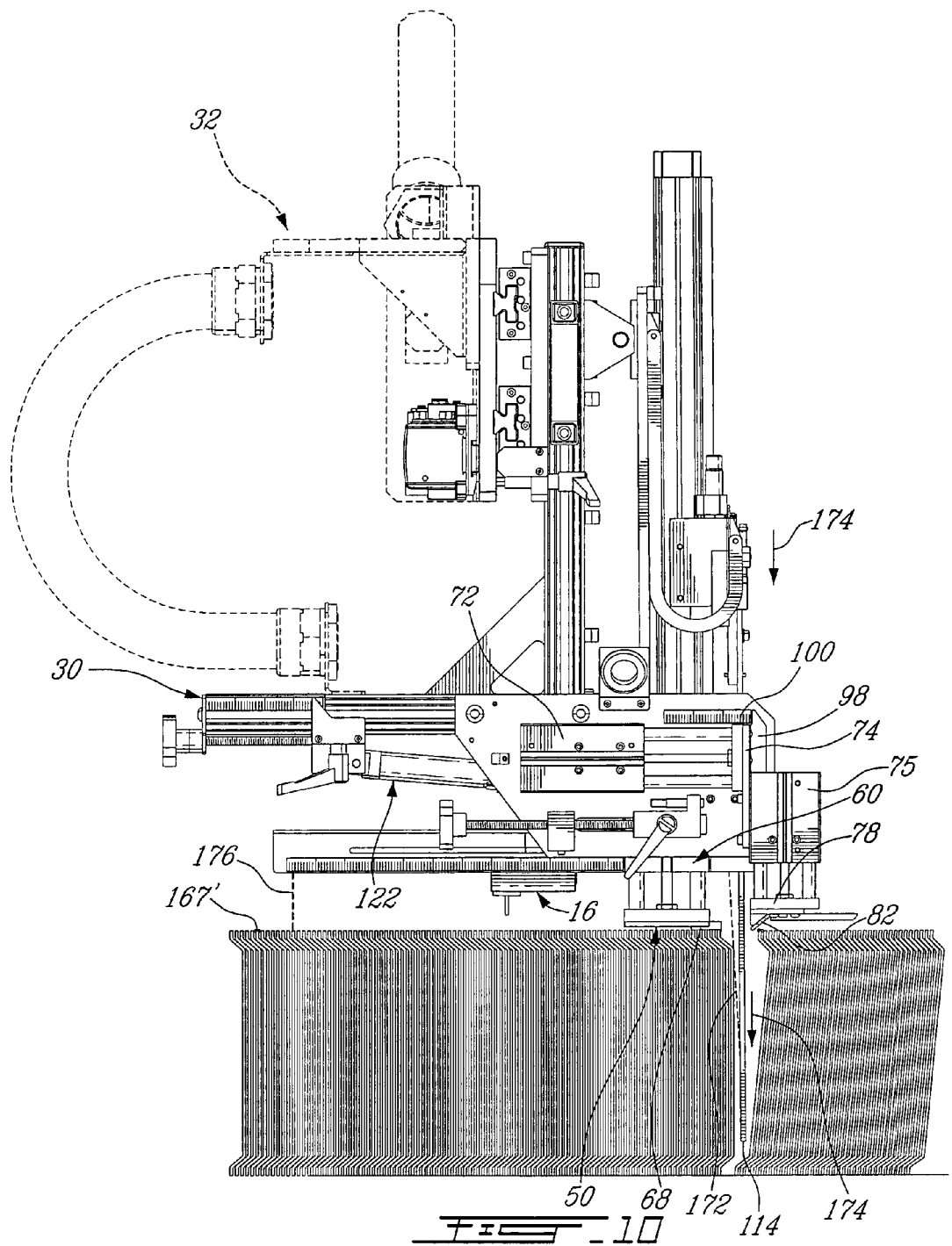

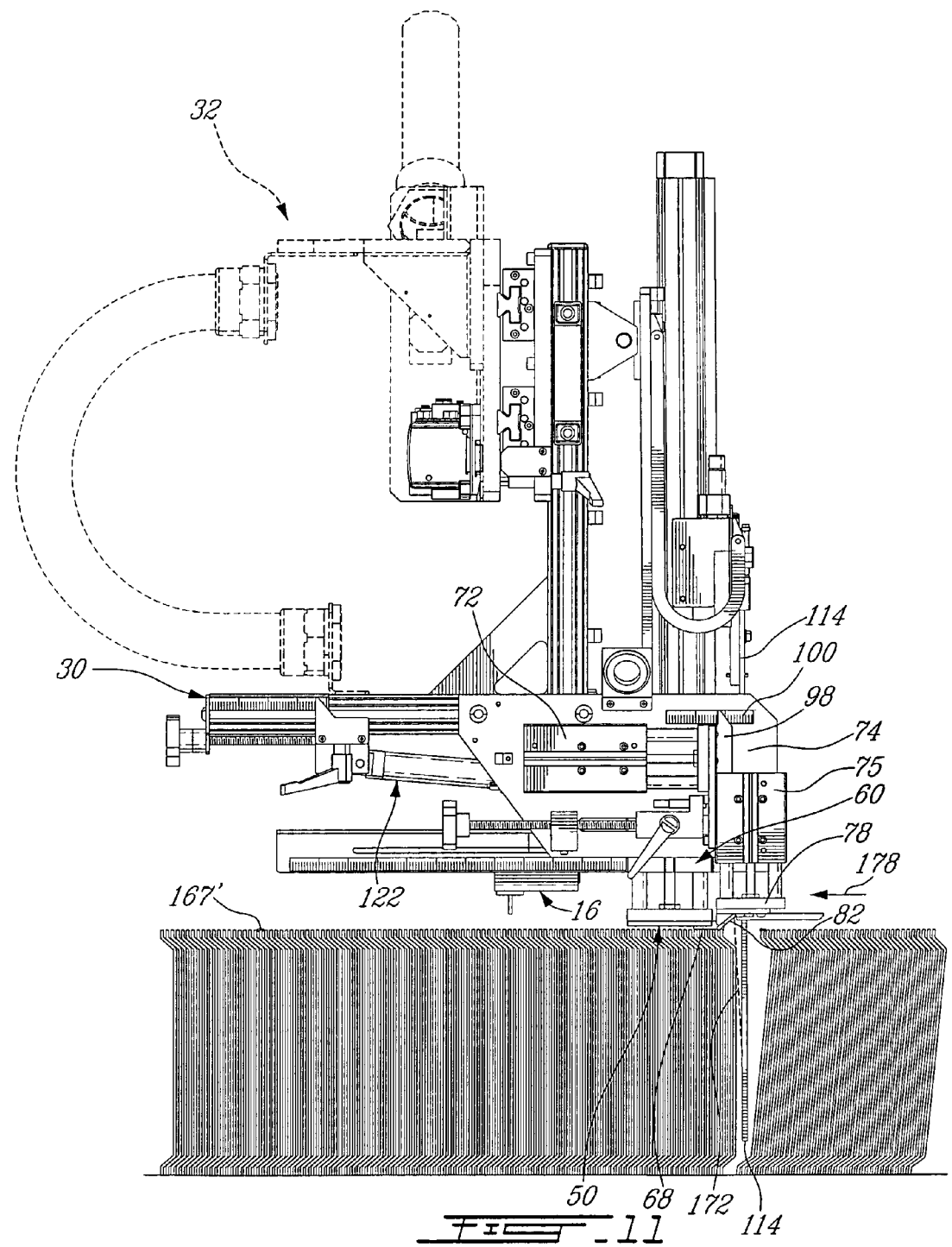

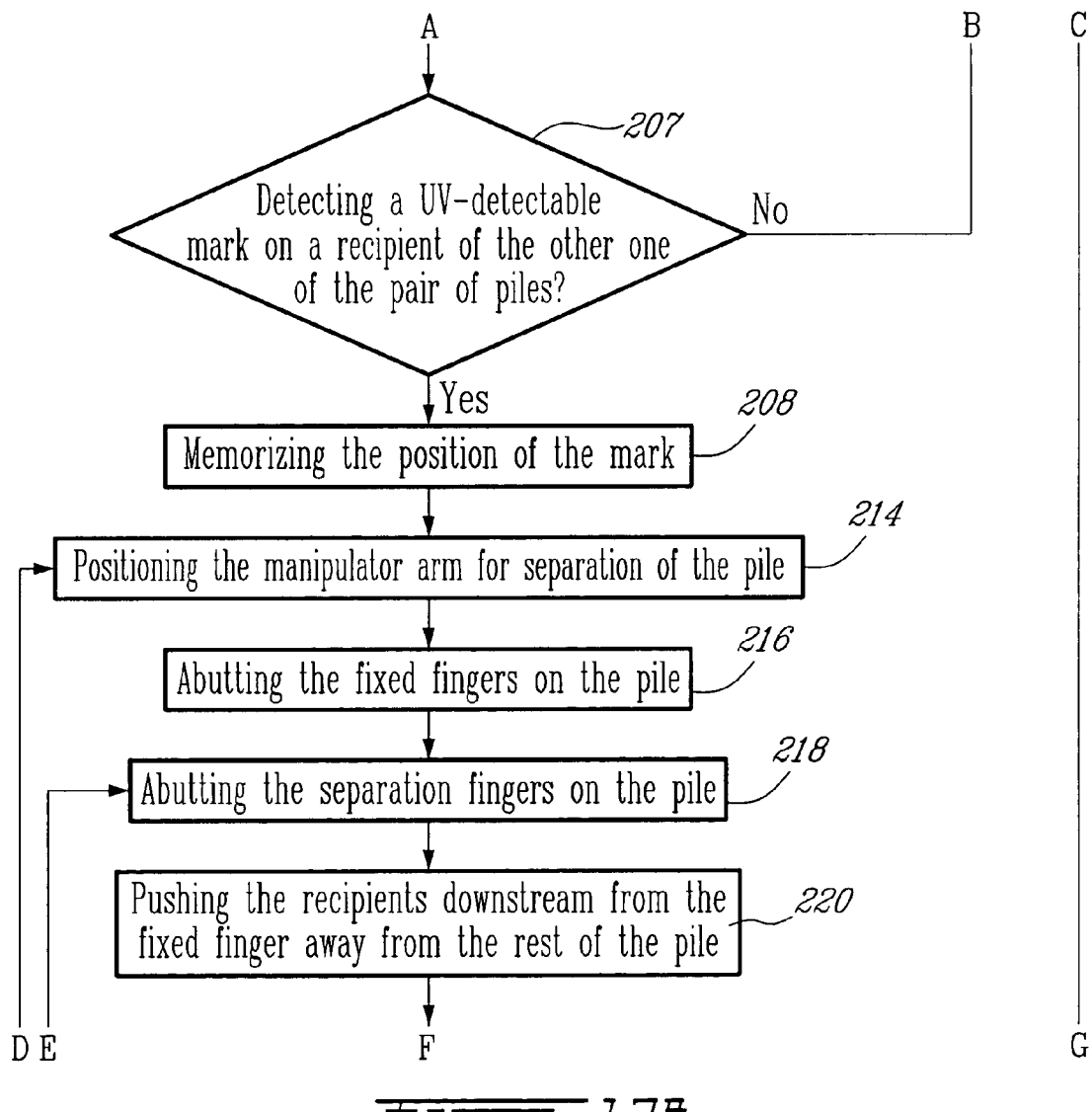

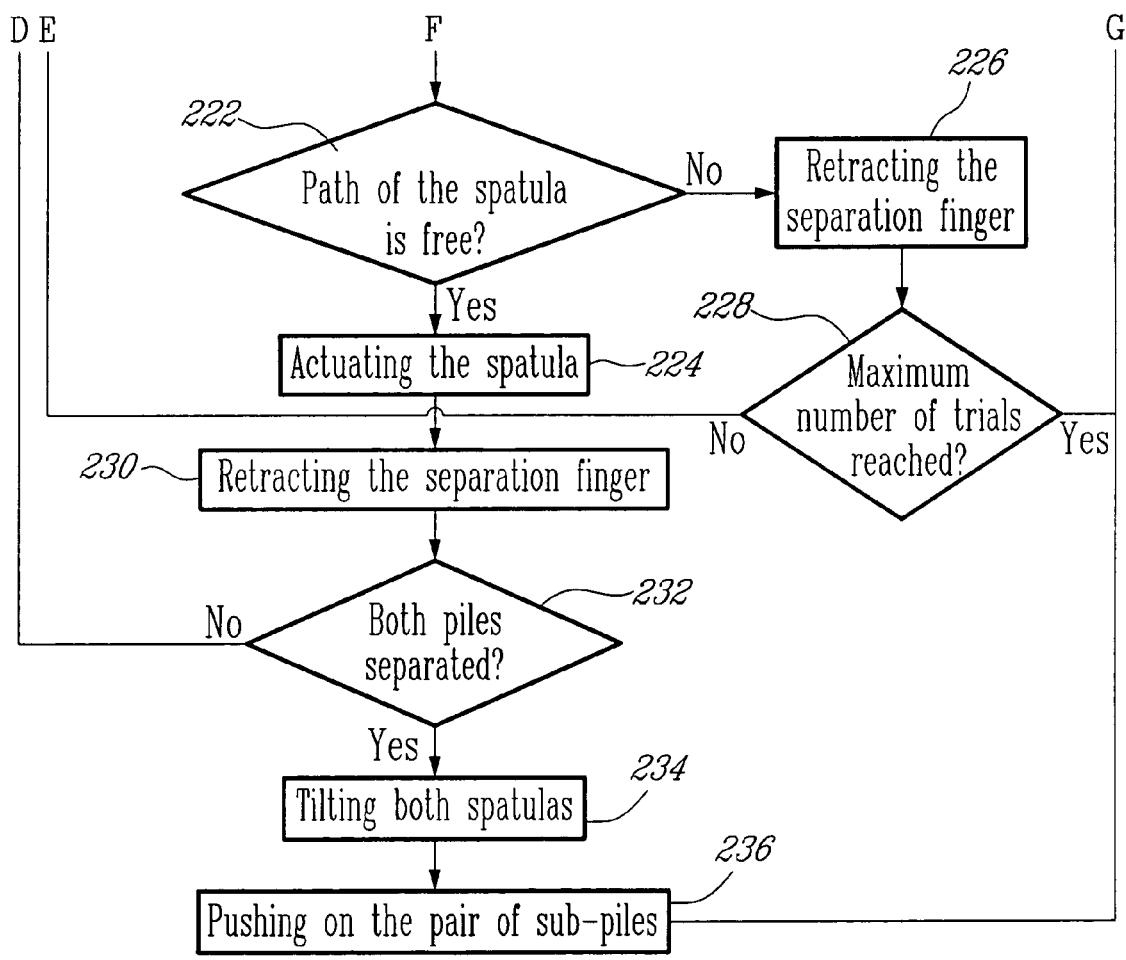

METHOD AND TOOL FOR THE SEPARATION OF A PILE OF RECIPIENTS

FIELD OF THE INVENTION

The present invention generally relates to manufacturing and handling of recipients. More specifically, the present invention is concerned with a method and tool for separation of a pile of recipients.

BACKGROUND OF THE INVENTION

The manufacturing process of Styrofoam or other types of recipients usually ends by the manufactured recipients exiting a trim press on a feed table. The recipients are then separated in groups of a predetermined number of recipients, which are then packaged for shipping. The conventional method of separating the recipients involves the steps of individuals manually counting the appropriate number of recipients on the feed table and feeding them to bags or boxes for shipping. A drawback of this conventional recipient separating method is that it is time consuming and bound to error as any other human-handled repetitive process.

OBJECTS OF THE INVENTION

An object of the present invention is therefore to provide an improved method and tool for the separation of a pile of recipients.

SUMMARY OF THE INVENTION

More specifically, in accordance with an aspect of the present invention, there is provided a separation tool for separating a pile of recipients into sub-piles of recipients, the tool comprising: a frame; a sensor mounted to the frame for detecting the last recipient of a first sub-pile or the first recipient of a second sub-pile upstream from the first sub-pile; the first recipient of the second sub-pile being the recipient adjacent the last recipient of the first sub-pile upstream therefrom; at least one manipulator arm mounted to the frame; the at least one manipulator arm including a mechanical hand assembly having a fixed finger assembly for holding one of i) the last recipient of the first sub-pile and ii) the first recipient of the second sub-pile, and a separation finger assembly for pushing the other of the one of the last recipient of the first sub-pile and the first recipient of the second sub-pile.

According to a more specific aspect of the present invention, there is provided a separation tool for separating a pile of recipients into sub-piles of recipients, the tool comprising: a frame; a sensor mounted to the frame for detecting a marked recipient; the marked recipient having an adjacent recipient; at least one manipulator arm mounted to the frame; the at least one manipulator arm including a) a mechanical hand assembly having a fixed finger assembly for holding one of the marked recipient and the adjacent recipient, and b) a separation finger assembly for pushing the other of one of the marked recipient and the adjacent recipient away from the one of the marked recipient and the adjacent recipient.

A separation tool according to the present invention allows providing for both a faster and more efficient recipient separation process.

According to a further aspect of the present invention, there is provided a method for separating a pile of recipients into sub-piles of recipients, the method comprising: i) considering the first recipient of the pile of recipients as the first recipient of a current sub-pile of recipients; ii) searching the last recipient of the current sub-pile and the first recipient of a following sub-pile; the first recipient of the following sub-pile being the recipient adjacent the last recipient of the current sub-pile upstream therefrom relatively to the first recipient of the sub-pile; iii) holding one of the last recipient of the current sub-pile and the first recipient of the following sub-pile; and iv) pushing the other of the one of the last recipient of the current sub-pile and the first recipient of the following sub-pile away from the one of the last recipient of the current sub-pile and the first recipient of the following sub-pile, yielding a separating gap between the first sub-pile and the following sub-pile.

Other objects, advantages and features of the present invention will become more apparent upon reading of the following non-restrictive description of preferred embodiments thereof, given by way of examples only with reference to the accompanying drawings.

BRIEF DESCRIPTION OF THE DRAWINGS

In the appended drawings:

FIG. 6 is a side elevation view of the tool from FIG. 1, illustrating the positioning of the tool above the pile of recipients for separation thereof;

FIG. 7 is a side elevation view of the tool from FIG. 1, illustrating the lowering of the fixed and separation fingers on the pile of recipients;

FIG. 8 is a side elevation view of the tool from FIG. 1, illustrating the pushing of a portion of the pile of recipients by the separation finger;

FIG. 9 is a close-up view taken along line 9-9 on FIG. 8;

FIG. 10 is a side elevation view of the tool from FIG. 1, illustrating the lowering of the spatula;

FIG. 11 is a side elevation view of the tool from FIG. 1, illustrating the retraction of the separation finger while the spatula is lowered; and FIGS. 12A-12C show a flowchart illustrating a method for separating a pile of recipients into sub-piles of recipients according to an illustrative embodiment of the present invention.

DETAILED DESCRIPTION OF THE INVENTION

Figure 1:
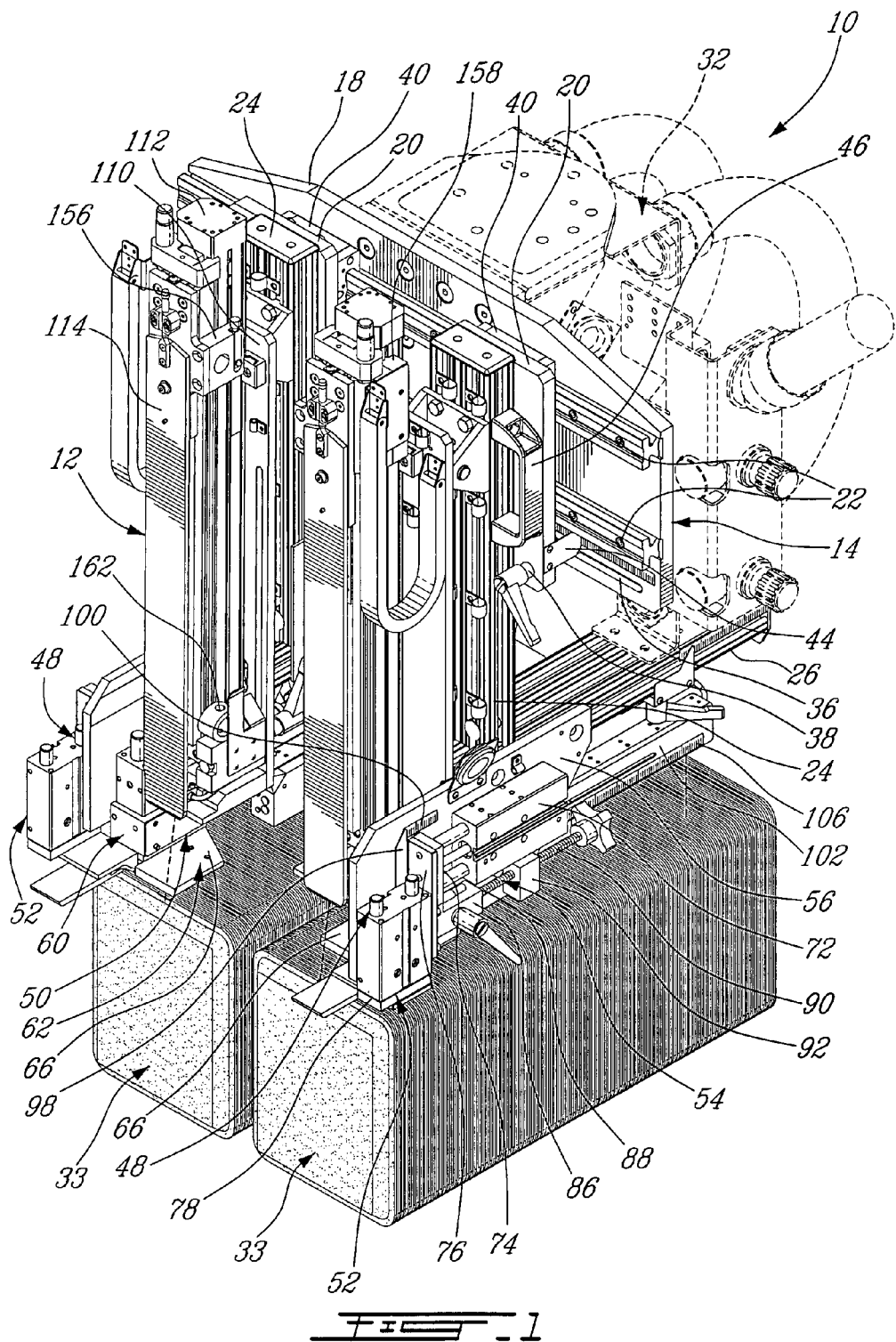
FIG. 1 is a front top perspective view of a tool for the separation of a pile of recipients according to an illustrative embodiment of a first aspect of the present invention.
Figure 2:
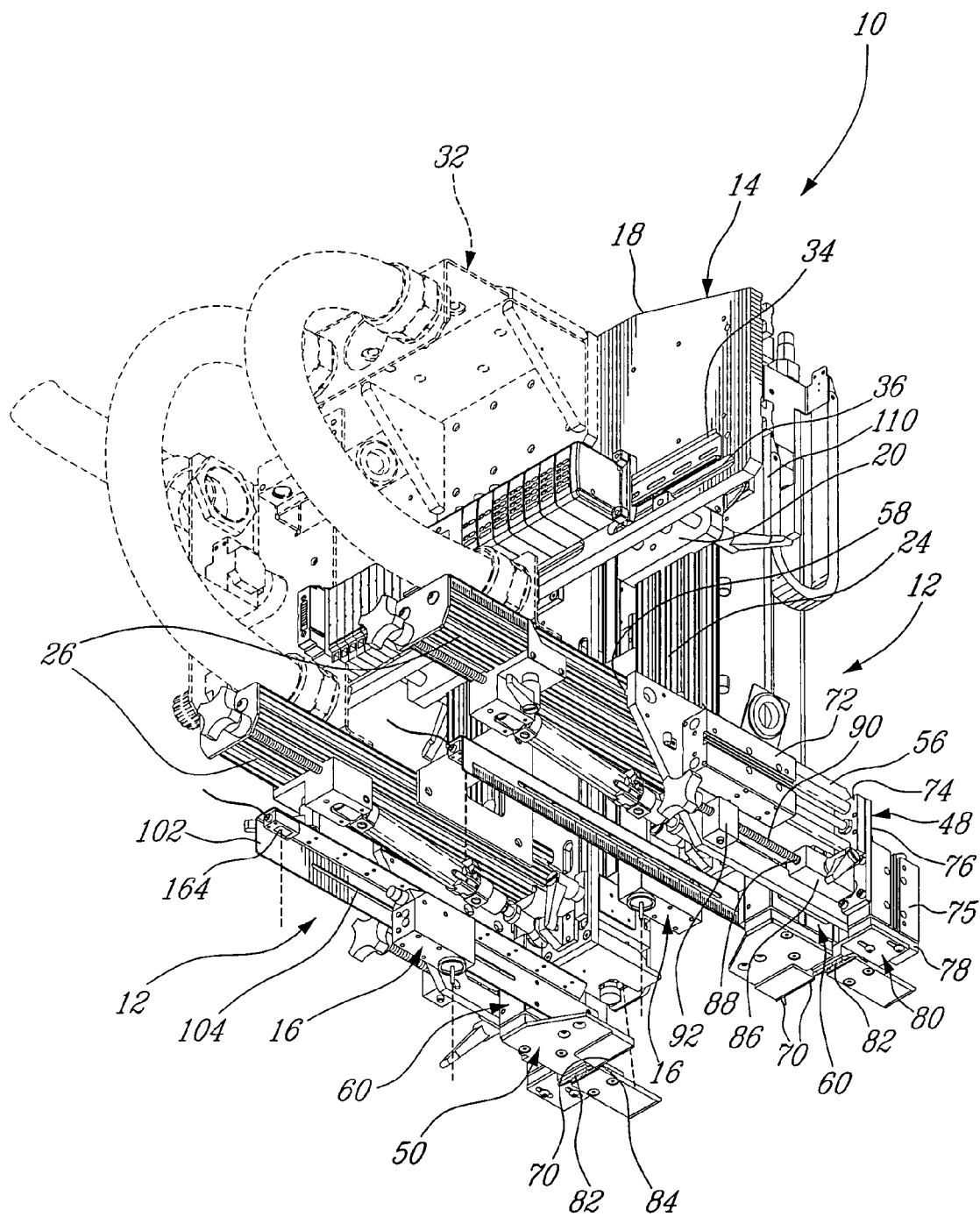
FIG. 2 is a back bottom perspective view of the tool from FIG. 1.
Figure 3:
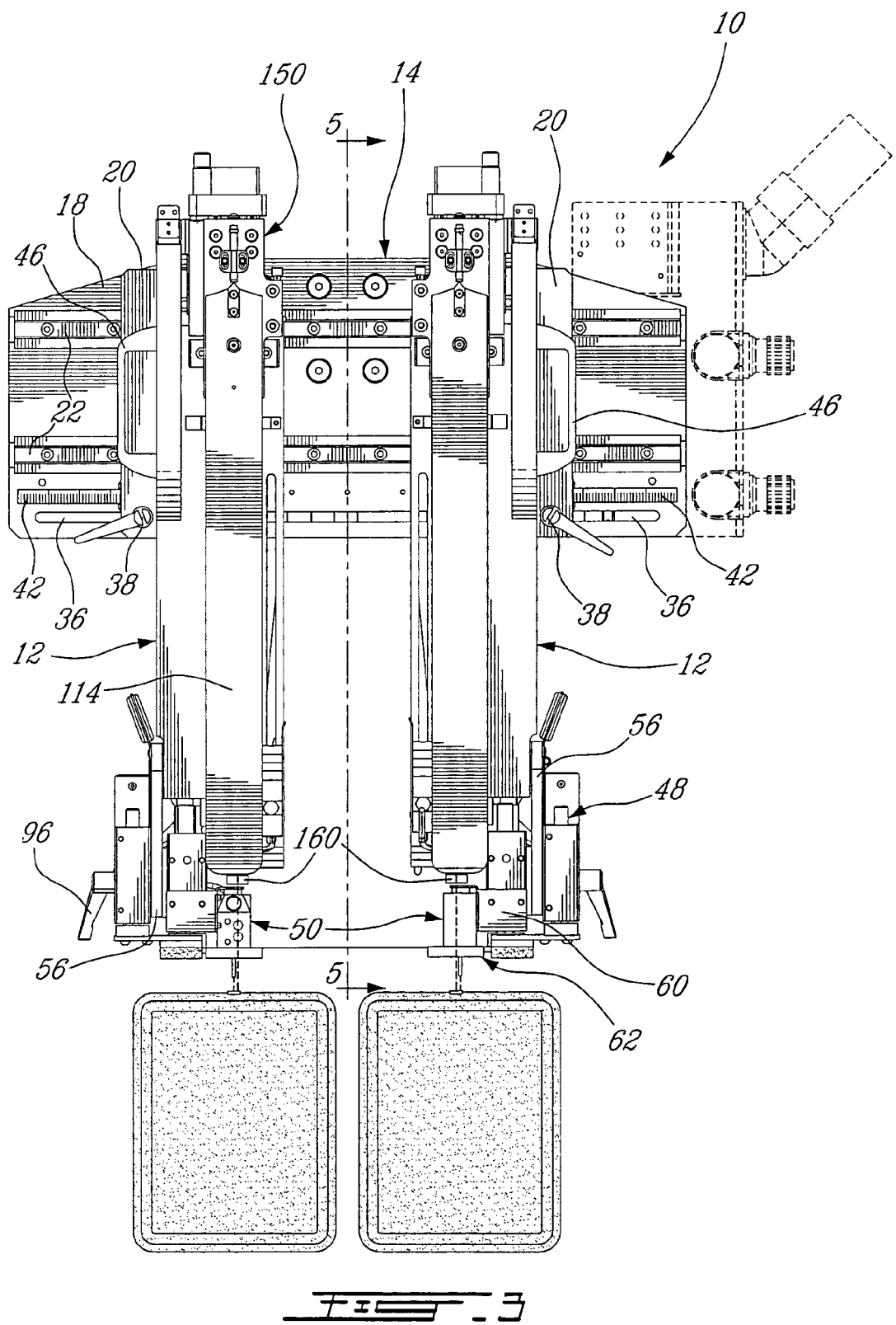
FIG. 3 is a front elevation view of the tool from FIG. 1.
Figure 4:
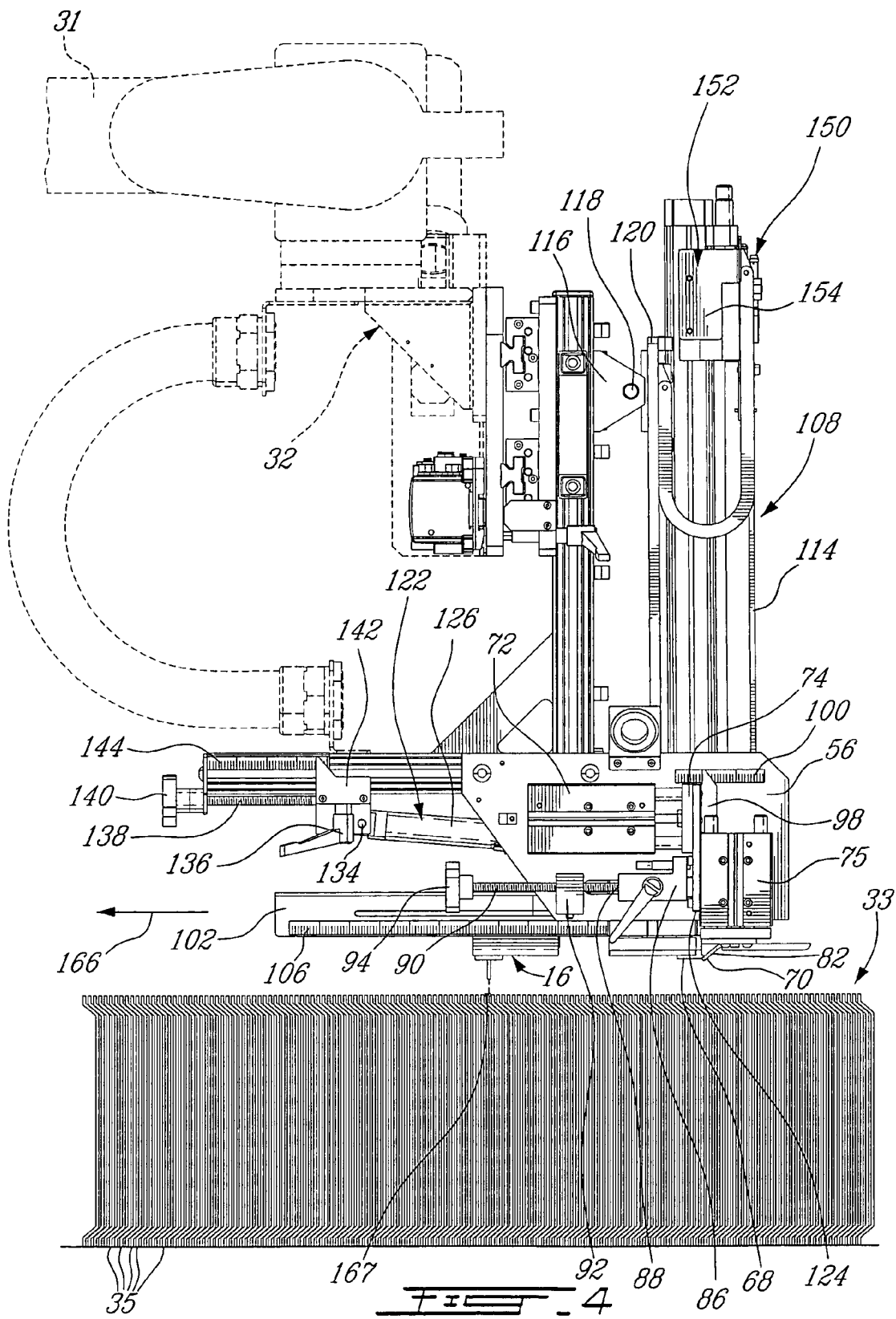
FIG. 4 is a side elevation view of the tool from FIG. 1, illustrating the detection of a marked recipient by the sensor of the tool.

A robot separation tool 10 for separating a horizontal pile of recipients into sub-piles of recipients according to an illustrative embodiment of a first aspect of the present invention will now be described with reference to FIGS. 1 to 5.

The tool 10 includes two symmetrically identical manipulator arms 12 mounted on a frame 14, each provided with a marked-recipient detector in the form of a ultra-violet (UV) sensor 16.

The frame 14 includes a manipulator arm mounting plate 18, two manipulator arm receiving members 20 mounted to the mounting plate 18 via two horizontal parallel rails 22 so as to be slidable along the width of the mounting plate 18, two vertical mounting rails 24, and two horizontal mounting rails 26, each secured to a respective vertical mounting rail 24 via a securing plate 28 (see FIG. 5), yielding a generally L-shaped member 30. One skilled in the art will easily understand that movements along three axes are therefore possible.

As will become more apparent in the following, the frame 14 should be construed as any parts of the tool 10 bringing either support thereto or allowing mounting other parts or components thereto. Moreover, the frame 14 can be modified to receive more or less than two manipulator arms.

The manipulator arm mounting plate 18 is secured to a conventional robot arm 31, such as model IRB 640 from ABB, via a tool-mounting bracket 32. The manipulator arm 31, which is illustrated in dashed lines, allows positioning and moving of the tool 10 over the pile of recipients 33. Of course, the manipulator arm 31 may have any configuration allowing for the positioning and moving of the tool 10 as will be described herein in more detail.

The tool-mounting bracket 32 includes brackets or other mounting means for receiving from the robot arm 31 power supply for the operation of the tool 10, including electrical and/or pneumatic supply.

As it is conventionally known in the art, the robot's controller (not shown) provides the control of the tool 10.

Since robot arms and tool controls are believed to be well known in the art they will not be described herein in more detail.

The manipulator arm mounting plate 18 is provided with means 34 for receiving the input block and the valve terminal. Such means can be in the form of the illustrated track 34, but can of course take other forms.

The manipulator arm mounting plate 18 also includes two elongated slots 36, each one for receiving one of the two locking cursors 38, each mounted to a respective manipulator arm receiving member 20 near the side thereof. The locking cursors 38 allow setting the position and then preventing any displacement of the member 20 along the rails 22. Indeed, each manipulator arm receiving member 20 is in turn mounted to the rails 20 via two blocks 40, each provided with a groove so configured and sized as to be complementary to the rail 22, so that the rail 22 are received therein. Rules 42 are provided on the mounting plate 18 to help in the positioning of the manipulator arm 12 along the mounting plate 18. For that purpose, an indicator, in the form of a thin plate 44, is secured on the edge of the manipulator arm-receiving member 20 and indicates on the rule 42 the position of the arm 12. Of course, the rules 42 and indicator 44 have to be properly positioned and configured in order to provide for precise readings.

Of course, the manipulator arm-receiving members 20 can have other configuration allowing the manipulator arms 12 to be mounted to the robot arm 32 via the mounting plate 18. Also, the indicator system can take other forms such as a digital readout (not shown), allowing the adequate positioning of the manipulator arm for specific dimensions and positions or recipients for example.

A handle 46 secured to each vertical mounting rail 24 at the level of the manipulator arm mounting plate 18 helps the manual sliding and positioning the corresponding manipulator arm 12 along the rails 22.

The manipulator arm 12 will now be described. It is to be noted that the two manipulator arms 12 are symmetrically identical. For such reason and for concision purpose, only one of the two manipulator arms 12 will be described herein. However, for clarity purposes, the reference numerals will be positioned on either of the arms 12. As will be explained hereinbelow, the number of manipulator arms 12 may vary from one to many. Of course, the manipulator arm mounting bracket 32 and manipulator arm mounting plate 18 are configured for receiving the number of manipulator arms 12 required by the specific application.

The manipulator arm 12 comprises a mechanical hand assembly 48 including a fixed finger assembly 50, a separation finger assembly 52 and a separation finger assembly course limiter 54.

The mechanical hand assembly 48 includes a mounting plate 56 slidably mounted to the horizontal rail 26. More specifically, the mounting plate 56 includes an elongated protrusion 58 that is snapfitted to the rail 26 (see FIG. 2).

The fixed finger assembly 50 is said to be fixed so as to be distinguishable from the separation finger assembly 52, since contrarily to the separation finger assembly 52, it cannot reciprocate along an axis parallel to the mounting plate 56. However, similarly to the separation finger assembly 52 and as will now be described in more detail, the fixed finger assembly 50 is mounted to the plate 56 so as to reciprocate towards to and away from a pile of recipients 33. The fixed finger assembly 50 comprises a linear actuator in the form of a guided drive 60 that can be of the DFM type from Festo and having a cylinder 64 and a contact plate 62 secured thereto. The guided drive 60 is secured to the mounting plate 56 on the inner surface thereof. Of course, other types of linear actuators can alternatively be used.

The contact plate 62 includes an extending portion 66 that extends sideways from the cylinder 64. The extending portion 66 of the bottom surface of the contact plate 62 is provided with a linear grip 70 extending from the contact plate 62 in a direction away from the cylinder 64 of the guided drive 60 and located along the front edge of the extending portion 66.

Alternatively, the fixed finger 50 can have other configuration allowing holding either the last recipient of a sub-pile or the first recipient of the following sub-pile.

The separation finger assembly 52 comprises a first guided drive 72 mounted to the mounting plate 56 so as to be operable in a horizontal plane, a second guided drive 75 mounted to the contact plate 74 of the guided drive 72 so as to be operable in a vertical plane while being movable as a whole in a horizontal plane. More specifically, the second guided drive 75 is mounted to the contact plate 74 of the first guided drive 72 through a small elongated plate 76 so fastened to the contact plate 74 and so configured as to position the second guided drive 75 so that its cylinder 78 is generally levelled with the cylinder 64 of the guided drive 60. A contact plate 80, provided with a friction pad 82 is secured to the cylinder 78 of the second guided drive 75. The mounting of the second guided drive 75 to the cylinder of the first guided drive 72 perpendicularly thereof allows the cylinder 78 to reciprocate between a retracted position and an extended position along a range of orientations comprised between the respective orientation of the guided drives 72 and 75.

Alternatively to the above-described configuration, the separation finger 52 according to the illustrative embodiment can be replaced by other means allowing to push one of the last recipients of the current sub-pile and the first recipient of the next sub-pile away from the other, so as to yield a separation gap between the first sub-pile and the following sub-pile The separation finger assembly course limiter 54 allows setting the maximum separation overture, as defined by the gap between the linear grip 70 and the edge 84 of the friction pad 82 nearest the fixed finger 50.

The separation finger course limiter 54 is in the form of a mechanical stop 86 provided at the distal end 88 of a threaded rod 90 inserted in an internally threaded cube 92 fastened to the mounting plate 56 below the guided drive 72. The free end of the threaded rod 90 is provided with a knob 94. A locking handle 96 allows locking the axial position of the mechanical stop 86. A marker 98 fixedly mounted to contact plate 74 and/or second guided drive 75, allows indicating on a rule 100 the displacement of the separation finger assembly 52 along the operating direction of the first guided drive 72.

Each UV sensor 16 is secured to a respective manipulator guided drive 60 of the fixed finger assembly 50 via an elongated bracket member 102. The elongated member 102 is provided with a longitudinal slit 104 configured and sized to receive a screw (not shown) secured to the casing 105 of the UV sensor. The elongated member 102 is fixedly mounted to the guided drive 60 via screws or other fastening means so as to be oriented generally perpendicular to the operating orientation of the cylinder 64 thereof. A rule 106 is provided on the surface of the member 102, opposite the sensor 16 parallel to the slit 104, allowing for a precise positioning of the sensor 16.

The sensor 16 can be, for example, a model LUT3-650 from SICK. The sensor 16 allows detecting marks on recipients made using UV detectable ink. Of course, other types of sensors may alternatively be configured to detect other types of markings.

The manipulator arm 12 further comprises a spatula assembly 108 including a spatula mounting plate 110 mounted to the L-shaped member 30, a rodless cylinder 112 secured to the mounting plate 110 so as to extend along downwardly thereof and a spatula 114, in the form of an elongated plate, slidably mounted to the rodless cylinder 112 generally parallel thereof.

The spatula mounting plate 110 is pivotally mounted to the vertical mounting rail 24 of the L-shaped member 30 via a mounting bracket 116 having a pivot pin 118 fixedly mounted to the mounting plate 110 near its higher longitudinal end 120.

The spatula 114 is slidably mounted to the rodless cylinder 112 via the carriage 150 of the rodless cylinder 112.

Since rodeless assemblies 112 are believe to be well known in the art, they will not be described herein in more detail.

The spatula 114 is fastened to the carriage 150.

The spatula assembly 108 further comprises a spatula sensor 160 mounted to the bottom portion of the beam 112. The spatula sensor is in the form of a photocell. The spatula sensor 160 is positioned adjacent the spatula 114 to detect if the path of the spatula 114 is free of any obstacle.

A spatula stroke limiter, in the form of a resilient piece of metal 162 is secured to one side of the beam 112 so as to be within the path of the carriage 152 and more specifically to be abutted by one of the two opposite side portions 154-156 so as to limit the downward stroke thereof.

The spatula assembly 108 can have other configurations allowing a spatula to be mounted to the manipulator arm 12 so as to be movable between a retracted and an extended position between the fixed and separation finger assembly 50-52.

A spatula angle setter 122 (see FIG. 4) mounted to both the horizontal rail 26 of the L-shaped member 30 and to the lower longitudinal end 124 of the mounting plate 110 allows adjusting the tilt angle of the spatula assembly 108.

Figure 5:
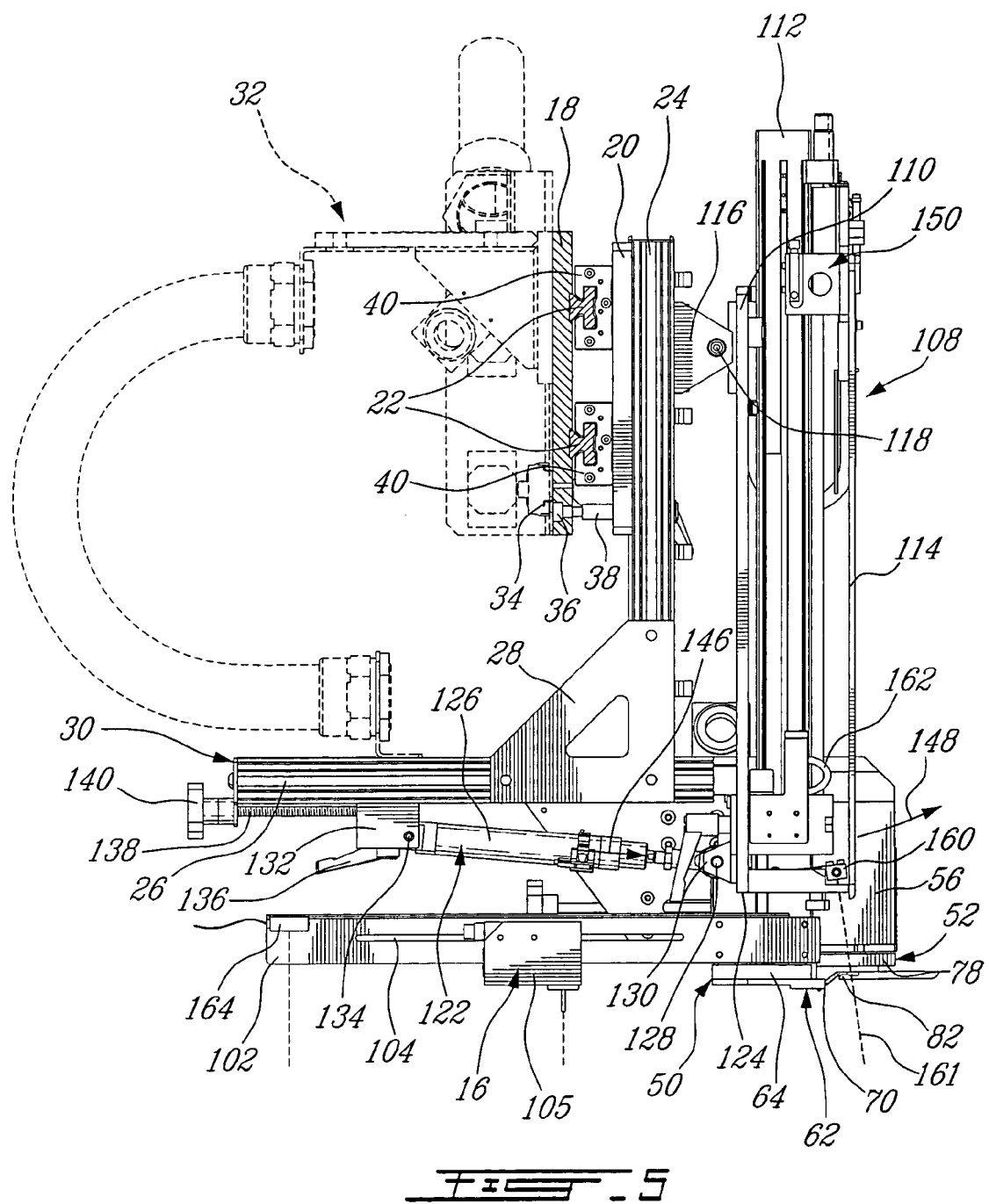
FIG. 5 is a cross-section taken along line 5-5 from FIG. 1.

As better seen in FIG. 5, the spatula angle setter 122 comprises a cylinder 126 whose distal end is pivotally mounted to a pivot pin 128 that is fixedly mounted to a mounting bracket 130, which is, in turn, secured to the mounting plate 110 near the lower longitudinal end 124 thereof. The proximate end of the cylinder 126 is pivotally mounted to a small carriage 132 via a pivot pin 134 secured thereto. The carriage 132 is mounted to the horizontal mounting rail 26 so as to be slidably movable thereon. A locking mechanism 136 on the carriage 132 allows selectively preventing any movement of the carriage 132 along the horizontal mounting rail 26.

A threaded rod 138 operable through a knob 140 is mounted to both rails 26 and the carriage 132 and allows adjusting the longitudinal position of the carriage 132 along the rail 26. An indicating cursor 142 fastened or integral to the carriage 132 allows indicating on the rule 144 the angle of the spatula 114 relatively to the horizontal rail 26. Of course the rule is so configured and positioned along the rail as to provide representative readings indicative of the angle of the spatula.

Before operation of the tool 10, the angle of the spatula 114 is adjusted relative to the horizontal rail 26 by rotating the knob 140. Rotation of the knob 140, and therefore of the threaded rod 138, in a first direction causes the carriage 132 to be pushed along the rail 26, which in turn causes the cylinder to push on the lower longitudinal end 124 of the mounting plate 110 (see arrow 146 on FIG. 5), biasing the lower end of the spatula 114 away from the knob 140 (see arrow 148 on FIG. 5). Obviously, rotation of the knob 140 in the opposite direction causes the lower end of the spatula 114 to be tilted in the opposite direction.

The spatula angle setter 122 can of course have other configurations. Also, the orientation of the spatula 114 can be permanently set.

Each of the two manipulator arms 12 finally includes a start-of-pile detector 164 (FIG. 2) mounted to the bracket member 102 near the proximate end thereof. The start-of-pile detector 164 is in the form, for example, of an optical detector, model WT4-2P331 by SICK.

Figure 12A:
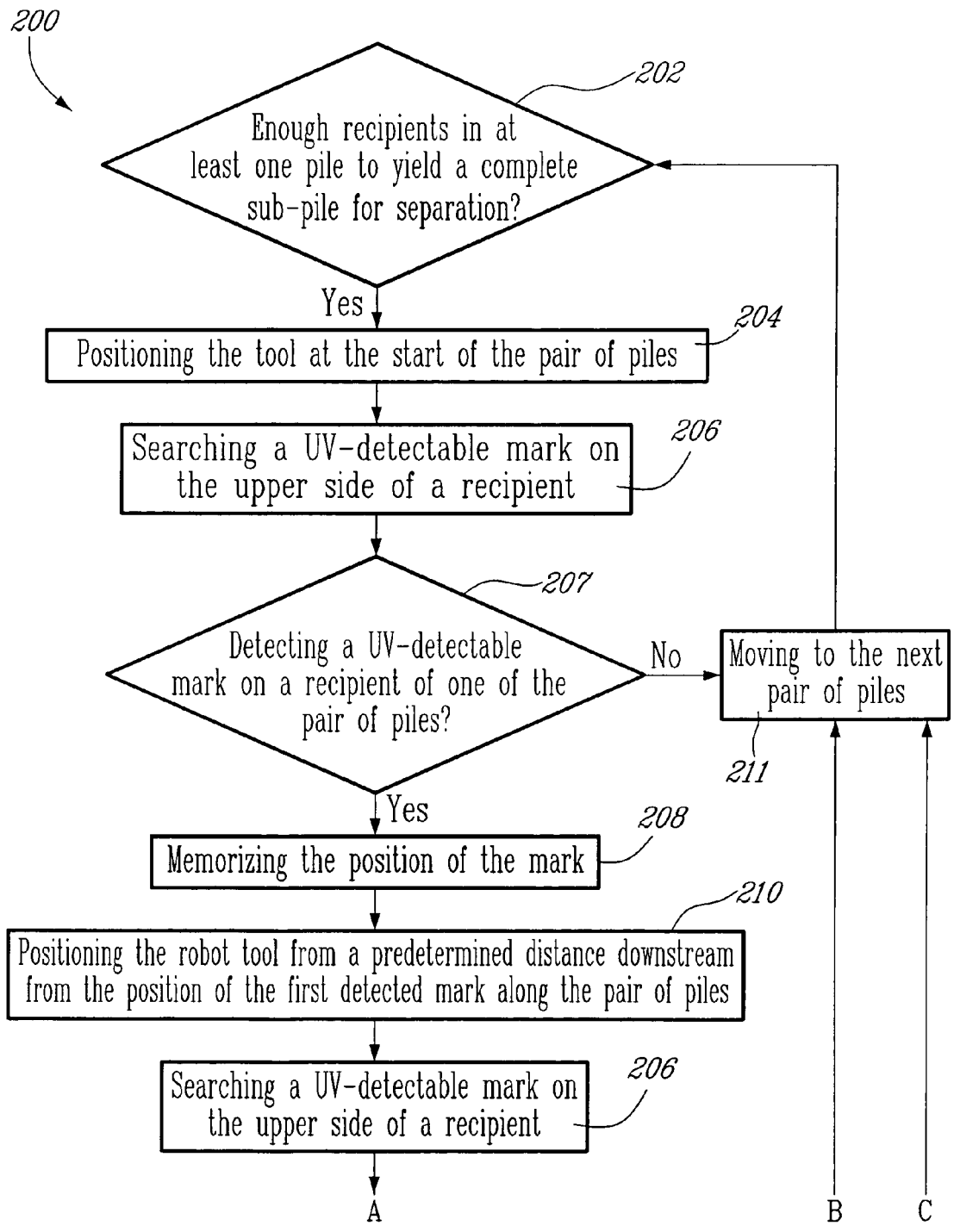

The operation of the tool 10 and more specifically of each of the two manipulator arms 12 will now be described with reference to FIGS. 4-11 and according to a method 200 for separating a pile of recipients into sub-piles of recipients according to an illustrative embodiment of a second aspect of the present invention as illustrated in FIG. 12.

In the illustrated example, the recipients 35 are brought on a feed table (not illustrated) in parallel pairs of parallel adjacent piles 33 (only one pair illustrated). The separation tool 10 allows covering the entire width of the table and the length of its stationary portion. Since the tool 10 includes two manipulator arms 12, it can be used to simultaneously separate two adjacent piles 33. Of course, providing the tool 10 with a different number of manipulator arms would allow the tool 10 to simultaneously separate any number of parallel piles.

The separation tool 10 allows i) the detection of the position of separation in each of the pair of pile 33, yielding two adjacent sub-piles of a predetermined length, ii) the separation of each sub-pile of recipients from the remaining of the corresponding pile, and iii) holding the pair of sub-piles of recipients while they are pushed away from the remaining of the piles.

A method for separating a pile of recipients into sub-piles of recipients according to an aspect of the present invention includes the following steps:

considering the first recipient of the pile of recipients as the first recipient of a current sub-pile of recipients;

searching a marked recipient of the current sub-pile the recipient following the marked recipient being the first recipient of the following sub-pile and needing to be separated from the marked recipient;

holding the marked recipient; and pushing the first recipient of the following sub-pile away from the marked recipient, yielding a separating gap between the first sub-pile and following sub-pile.

Of course, the marked recipient could be the first recipient of the following sub-pile instead of the last recipient of the current sub-pile.

It is to be noted that the separation tool 10 may be so configured as to separate different sizes of recipients. Indeed, the tool 10 is made adjustable for recipients of different geometries. Such adjustments include for example:

- the distance between the two (or more) symmetrically identical arm 12;
- the separation gap between the fixed and separation fingers 50 and 52;
- the pressure applied by the fixed and separation fingers 50 and 52 onto the recipients;
- the course of the spatula 114; and
- the tilt of the spatula 114 relatively to the frame.

Turning now more specifically to FIG. 12, the first step (202) of the separation method 200 is the tool 10 verifying the state of the feed table before separating piles. The verification includes assessing whether there are sufficient recipients 35 for separation in at least one of the piles 33.

More specifically, when a detector (not shown) from the feed table and coupled to the robot controller (not shown) detects a high level on the feed table, the tool 10 moves to the high level portion of the table and scans all the piles to verify their respective level. The tool 10 will proceed with the separation of the first pile for which a high level is detected, unless, for some reason, it is prevented by the PLC (programmable logic controller), which controls the whole manufacturing process, from separating this specific pile. In this last case, the tool 10 continues its scan and proceeds with the separation of the next piles showing a high level and for which the separation is allowed by the PLC. After the separation of this pile (or pair of piles according to the present example), the tool 10 will proceed with the separation of the next adjacent pile (or the next adjacent pair of piles). Of course, the PLC and robot controller can be replaced by any other type of controllers.

If the low level detector (not shown) informs the robot 31 that no pile has reached the minimum level, the robot 31 is put in an idle state until the minimum level is detected.

The robot arm searches for the longest column to remove the exceeding recipients. When a high level is detected, the tool 10 is moved by the robot arm 31 at the start of piles (step 204).

The tool 10 is then moved upstream in search of a UV-detectable mark 167 (schematically illustrated as an inverted U-shaped element on the figures) on a recipient 33 (step 206). For that purpose, the tool 10 is translated along the first pile 33 towards the feeding direction (see arrow 166 in FIG. 4) until the UV sensor 16 detects a UV-detectable mark 167 on the upper side of a recipient 35 (step 207). Of course, the mark 167 has been added during the recipient manufacturing process using UV detectable chemical ink or a substance that is invisible at normal light. Readings are simultaneously considered from both UV sensors 16 so as detect a first mark on any one of the two piles.

Of course, paint, ink or other substances yielding visible markings at normal light can also alternatively be used. In that later case however, the sensor 16 is of course configured to detect such markings. The mark 167 is provided, during the recipient manufacturing process, every n recipients, n being the desired number of recipients 35 to be comprised in a sub-pile. Of course, the mark 167 can be provided at the end or at the beginning thereof. The tool 10 is programmed accordingly to yield the desired result, i.e. using the manipulator arm 12 to create an opening (a gap) in the pile 33 between the last recipient of a first sub-pile and the first recipient of the next sub-pile, as will be described hereinbelow. For such reason, the relative displacement of the recipient 35 and of the tool 10, and the relative position of the fixed and separation fingers 50-52 towards the direction of displacement of the tool 10 can be modified as long as the tool is controlled accordingly.

When a UV-detectable mark 167 is detected, the robot 31 stops and memorizes the position of the mark 167 and which one of the two piles has the mark 167 (step 208).

The robot 31 then positions the tool 10 from a predetermined distance downstream from the position of the first detected mark along the pair of piles (step 210) and repeats steps 206-208 for the other pile of the pair.

When no UV-detectable mark 167 is detected for either one of the two piles of the pair, the robot 31 moves to the next adjacent pair of piles (step 211) and repeat steps 204-210.

The separation positions, as detected by the sensors 16, are corrected to compensate for the displacement of the recipients 33 along the feed table. The separation position is computed, for example, as follows: the time delay since the detection of the mark 167 times the recipient feeding speed times the gap between two adjacent recipients 33.

In step 214, the tool is moved at the memorized separation position of the pile where the mark has been detected further upstream between the two piles from the pair.

As illustrated in FIG. 7, the guided drives 60 and 75 of the fixed finger 50 and then the separation finger 52 are actuated (steps 216 and 218) so that their respective contact plates 62 or 74 abuts the pile 33. Of course the tool 10 has been positioned at the appropriate distance from the pile 33 by the robot arm 31. While in this configuration, which is illustrated in FIG. 7, the fixed finger 50 holds the recipients from the next sub-pile, the grip 70 being positioned between the first recipient of the next pile and the last recipient of the current pile.

Then, in step 220, which is illustrated in FIGS. 8 and 9, the guided drive 72 is energized, causing the separation finger assembly 52 to move downstream (see arrow 170 in FIG. 8) thereby pushing the recipients of the current pile away from the recipients held by the fixed finger assembly 50.

The spatula sensor 160 is then triggered to assess whether or not the projected path of the spatula 114 is unobstructed (step 222). The sensor beam, of the spatula sensor 160 is represented by the dashed line 172 on both FIGS. 8-9. If the path is obstructed then i) the separation finger assembly 52 is retracted (step 226) and ii) verification is performed as to whether a predetermined number of separation trials have been reached (step 228). If this is true then the method 200 returns to step 211. If not, then the method returns to step 218. The predetermined number of trails can be, for example, three (3).

If the path is unobstructed then the spatula 114 is moved downwardly (step 224) as illustrated in FIG. 10 (see arrow 174).

The separation finger assembly 52 is then moved to its retracted position (step 230, see arrow 178 on FIG. 11).

Steps 214-220 are then repeated for the other pile of the pair (step 232).

The spatula angle setters 122 are then actuated (step 234), resulting in the tilting of both spatulas 114 so as to allow the spatula 114 to push on the recipients from the two adjacent separated sub-piles with two contact points on each recipient.

The robot arm 31 is then moved so as to push of both pair of separated sub-piles, yielding a gap between each of two separated sub-piles and the corresponding remaining piles (step 236).

The method 200 then proceeds with the separation of the next adjacent pair of piles.

Even though the present invention has been described with reference to generally rectangular recipients 35, it can be adapted to separate piles of recipients having other configuration. Moreover, adjusting the angle of the spatula 114 allows accommodating the tool 10 for recipients of different depth.

It is to be noted that even though the expressions "horizontal" and "vertical" have been used herein, the tool and method described and claimed herein could operate properly when positioned at different angles.

Although the present invention has been described hereinabove by way of preferred embodiments thereof, it can be modified, without departing from the spirit and nature of the subject invention as defined in the appended claims.

What is claimed is:

1. A separation tool for separating a pile of recipients into sub-piles of recipients, the tool comprising:
   a frame comprising a mounting plate, said plate comprising at least one first horizontal rail extending along the width thereof;
   a controller;
   a sensor linked to said controller and mounted to said frame for verifying the level of recipients in a given pile and transmitting this data to said controller for assessing if there are sufficient recipients in a given pile for separation into sub-piles, said sensor detecting the last recipient of a first sub-pile of that given pile or the first recipient of a second sub-pile upstream from said first sub-pile of that given pile; said first recipient of said second sub-pile being the recipient adjacent said last recipient of said first sub-pile upstream therefrom, said sensor transmitting this data to said controller, said controller being configured to consider the first recipient of the given pile as the first recipient of the first sub-pile and said adjacent recipient as the first recipient of a second sub-pile needing to be separated from said recipient of the first sub-pile;
   at least one manipulator arm linked to said controller for control thereof; said at least one manipulator arm being slidably mounted to a vertical rail that is slidably mounted to said first horizontal rail via a plate, and including a mechanical hand assembly being slidably mounted to a second horizontal rail and having a fixed finger assembly for holding one of i) said last recipient of said first sub-pile and ii) said first recipient of said second sub-pile, and a separation finger assembly for pushing the other of said one of said last recipient of said first sub-pile and said first recipient of said second sub-pile in accordance with the data received by said controller; and
   a tool-mounting element for mounting said tool to a robot arm for positioning and moving said tool over the pile of recipients,
   wherein said first and second horizontal rails provide for moving said at least one manipulator arm along respective first and second horizontal axes being generally orthogonal relative to one another and said vertical rail provides for moving said at least one manipulator arm along a vertical axis.

2. A tool as recited in claim 1, wherein said fixed finger assembly includes a linear actuator having a cylinder reciprocable in a vertical plane between a retracted position and an extended position and a contact plate secured to said cylinder for abutting one of a) said last recipient of said first sub-pile and b) said first recipient of said second sub-pile when said cylinder is in said extended position.

3. A tool as recited in claim 2, wherein said linear actuator is in the form of a guided drive.

4. A tool as recited in claim 2, wherein said contact plate is provided with a linear grip extending from said contact plate in a direction away from said cylinder.

5. A tool as recited in claim 1, wherein said separation finger assembly includes a first linear actuator having a first cylinder reciprocable in a horizontal plane between a first retracted position and a second extended position, and a first contact plate secured to said cylinder; said separation finger assembly further including a second linear actuator secured to said first contact plate so as to be generally operatively perpendicular from said first linear actuator; said second linear actuator having a second cylinder reciprocable in a vertical plane between a second retracted position and a second extended position and a second contact plate secured to said second cylinder for abutting the other of a) said last recipient of said first sub-pile and b) said first recipient of said second sub-pile when said second cylinder is in said second extended position, and for pushing the other of said one of said last recipient of said first sub-pile and said first recipient of said second sub-pile by moving said first cylinder from said first retracted position to said first extended position.

6. A tool as recited in claim 5, wherein said fixed finger assembly includes a third linear actuator having a third cylinder reciprocable in a vertical plane between a third retracted position and a third extended position and a third contact plate secured to said third cylinder for abutting one of c) said last recipient of said first sub-pile and d) said first recipient of said second sub-pile when said cylinder is in said extended position.

7. A tool as recited in claim 6, wherein said at least one manipulator arm includes a mounting plate having first and second opposite side face; said third linear actuator being secured to said mounting plate on said first side face thereof and said first linear actuator being so secured to said second side face so that said third contact plate is adjacent said third contact plate;
   whereby, in operation, said third contact plate abuts said second contact plate when said first linear actuator is in its retracted position, and said third contact plate is moved away from said second contact plate when said first cylinder is moved from its first retracted position to its first extended position.

8. A tool as recited in claim 6, wherein said at least one manipulator arm assembly further includes a spatula assembly having a spatula reciprocally mounted to said frame so as to move between a fourth retracted position away from said mechanical hand assembly to a fourth extended position whereby said spatula extends between said second and third mounting plate when said first linear actuator is in its first extended position.

9. A tool as recited in claim 5, wherein said spatula assembly includes a spatula angle setter for tilting said spatula with respect to said frame.

10. A tool as recited in claim 5, wherein at least one of said first linear actuator and said second linear actuator is in the form of a guided drive.

11. A tool as recited in claim 5, wherein second contact plate includes a friction pad.

12. A tool as recited in claim 1, wherein said sensor is secured to said at least one manipulator arm.

13. A tool as recited in claim 1, comprising two manipulator arms.

14. A tool as recited in claim 1, mounted to a controller; said tool being controlled by said controller.

15. A tool as recited in claim 14, wherein said controller is part of said robot arm 16. A separation tool for separating a pile of recipients into sub-piles of recipients, the tool comprising:
- a frame comprising a mounting plate, said mounting plate comprising at least one first horizontal rail extending along the width thereof;
- a controller;
- a sensor linked to said controller and mounted to said frame for detecting a marked recipient in a given pile of recipients and for transmitting this data to said controller; said marked recipient having an adjacent recipient, said controller configured to identify the first recipient of the given pile as the first recipient of a first sub-pile and said adjacent recipient as either the first recipient of a second sub-pile or the last recipient of the first sub-pile needing to be separated from said marked recipient;
- at least one manipulator arm linked to said controller for control thereof; said at least one manipulator arm being slidably mounted to a vertical rail that is slidably mounted to said first horizontal rail via a plate, and including a) a mechanical hand assembly being slidably mounted to a second horizontal rail and having a fixed finger assembly for holding one of said marked recipient and said adjacent recipient, and b) a separation finger assembly for pushing the other of one said marked recipient and said adjacent recipient away from said one of said marked recipient and said adjacent recipient in accordance with the data received by said controller; and
- a tool-mounting element for mounting said tool to a robot arm for positioning and moving said tool over the pile of recipients,
- wherein said first and second horizontal fails provide for moving said at least one manipulator arm along respective first and second horizontal axes being generally orthogonal relative to one another and said vertical rail provides for moving said at least one manipulator arm along a vertical axis.

* * * * *